United States Patent [19]

Fuller

[11] 4,096,670
[45] Jun. 27, 1978

[54] BUILDING STRUCTURAL SYSTEM

[76] Inventor: Ronald E. Fuller, P.O. Box 30485, Santa Barbara, Calif. 93105

[21] Appl. No.: 733,423

[22] Filed: Oct. 18, 1976

Related U.S. Application Data

[63] Continuation-in-part of Ser. No. 619,372, Oct. 3, 1975, abandoned.

[51] Int. Cl.² .......................... E04B 7/02; E04C 3/02
[52] U.S. Cl. ........................................ 52/90; 52/289; 52/665; 52/696; 52/702; 52/718; 403/232.1; 403/381
[58] Field of Search ............... 52/289, 666, 650, 233, 52/696, 700, 702, 708, 665, 713, DIG. 6, 579, 582, 236.9, 90; 403/381, 345, 331, 338, 232.1, 336; 5/300

[56] References Cited

U.S. PATENT DOCUMENTS

| 152,340 | 6/1874 | Cook | 403/331 |
|---|---|---|---|
| 770,050 | 9/1904 | Dreyer | 52/702 X |
| 796,433 | 8/1905 | Kahn | 403/232.1 |
| 1,181,934 | 5/1916 | Smith | 52/584 |
| 1,729,935 | 10/1929 | Froehlich | 52/713 X |
| 2,793,407 | 5/1957 | Johnston | 403/345 |
| 3,090,086 | 5/1963 | Fata | 403/381 |
| 3,365,222 | 1/1968 | Polyak | 403/384 |
| 3,601,428 | 8/1971 | Gilb | 52/702 |
| 3,683,429 | 8/1972 | Mis | 5/300 |
| 3,901,611 | 8/1975 | Simonsen | 403/187 |
| 3,914,914 | 10/1975 | Jureit et al. | 52/632 |
| 4,005,556 | 2/1977 | Tuomi | 52/650 |

FOREIGN PATENT DOCUMENTS

| 905,078 | 7/1972 | Canada | 403/381 |
|---|---|---|---|
| 625,593 | 4/1927 | France | 5/300 |
| 395,606 | 5/1924 | Germany | 5/300 |
| 3,677 of | 1813 | United Kingdom | 5/300 |
| 130,911 | 8/1919 | United Kingdom | 5/300 |

Primary Examiner—Leslie Braun
Attorney, Agent, or Firm—Spensley, Horn & Lubitz

[57] ABSTRACT

A new building structural system is described that employs unique elements to interconnect standard structural members in a simple, economical and effective manner. These unique interconnecting elements interconnct a girder and a span member of a building structure, the span member being either a joist or a truss. They consists of two interlocking pieces or elements, one connected to the end of the span member and the other connected to the side face of the girder member. These unique elements incorporate shaped involutions, webs and reinforcing members that interlock as one element seats down upon the other to interconnect the members in a rugged, rigid fashion. The resulting building structure provides both a flexibility of design and a simplicity of assembly that is remarkable.

5 Claims, 11 Drawing Figures

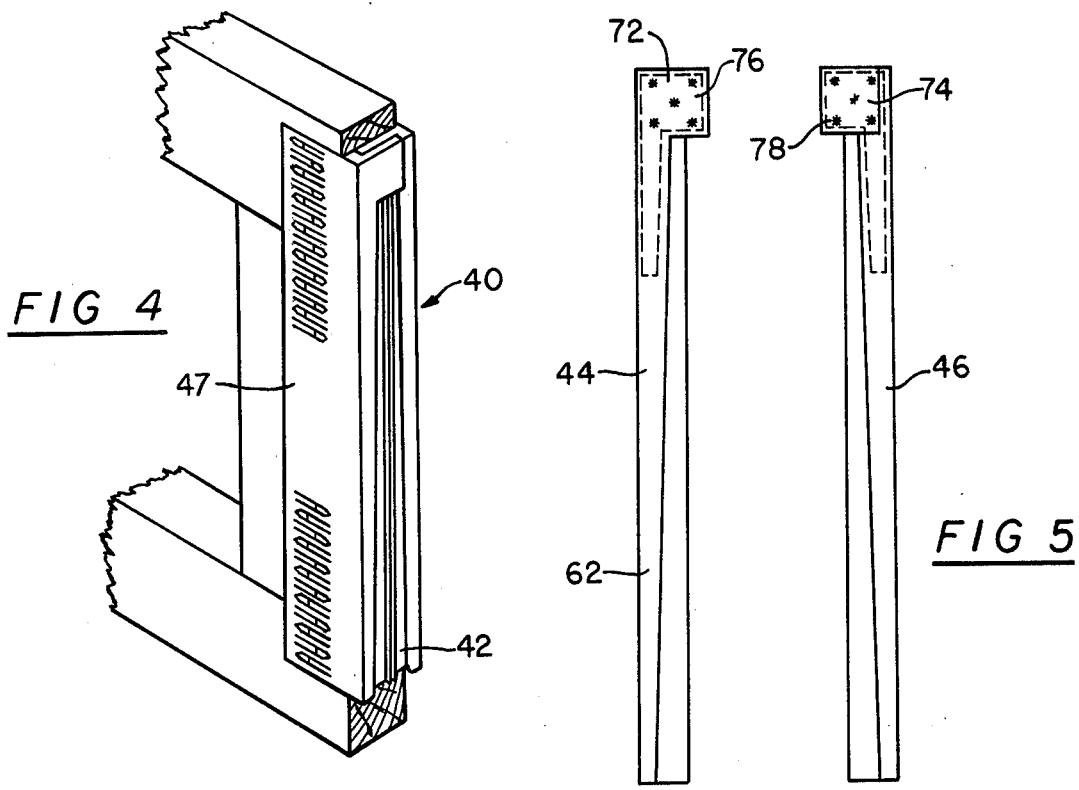
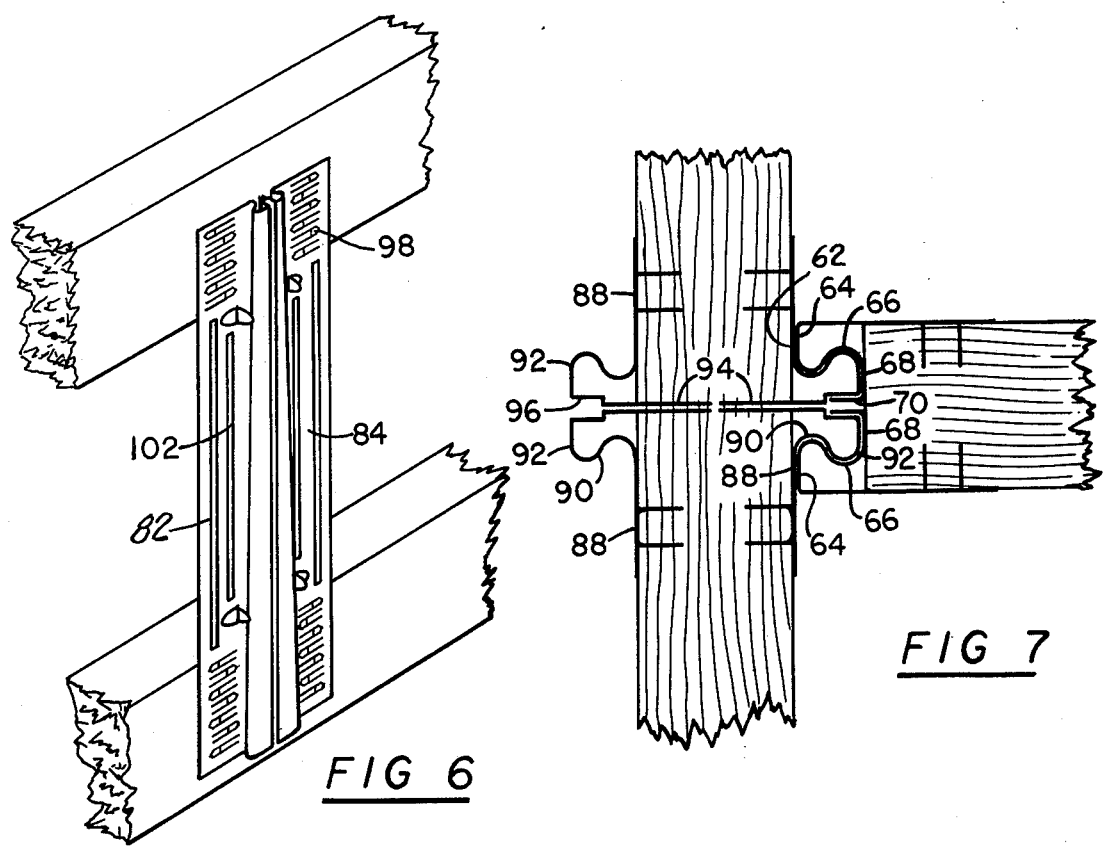

BUILDING STRUCTURAL SYSTEM

PRIOR APPLICATION

This application is a continuation-in-part of application Ser. No. 619,372 filed by the same applicant with the United States Patent Office on Oct. 3, 1975, and titled "Building Structure and Interconnecting Elements" now abandoned. By this reference, this disclosure is incorporated herein in its entirety.

INTRODUCTION

As construction costs rise and building materials become increasingly scarce, many efforts are being made to reduce, simplify and economize. One direction of such efforts has focused on the redesign of the components or elements of present buildings, providing mass produced modules such as bathroom and kitchen modules, as well as developing plumbing, wiring and other components of new designs and materials, both to reduce costs and to simplify assembly. Still though, buildings constructed with such modules and components must be put together for the most part on a cut-and-fit basis. Another direction of such efforts has been to mass produce an entire building, or a major portion of a building, then to provide the resulting structure with wheels and haul it by road to the building site. Since such a building must be capable of passing along highways, its width and length are limited by highway regulations. Accordingly, the design of such a building is quite limited and the advantages of factory assembly are offset to a large extent by such limitations.

An optimal building system would permit maximum factory assembly of standard building structural components, components which could be assembled quickly at the site in virtually any design preferred by the architect, then finished and utilities added to complete the building. An object of the invention is to provide such a system and the elements it requires.

Basic to the structure of any building are girders and span members, girders providing the basic skeleton of the building while the span members fill in the spaces between the girders to provide support for the horizontal surfaces of the building. Another object of the invention is to provide simple, rugged elements to interlock girders with one another and with the various types of span members. These elements must be easily attached to the various members, or economic constraints will severely limit their usefulness. They must permit reasonable tolerances or they will not withstand the vagaries of factory assembly, shipping, and on-site handling. They must properly position the girders and span members, or the resulting building will not be acceptable.

To meet these objectives, the unique interlocking elements disclosed in this application incorporate shaped involutions, webs, and reinforcing members, the elements interlocking as one seats down upon the other to interconnect girders and span members in a rugged, rigid fashion. Of course, there are many known elements which have been devised to interlock girder and span members. In their simplest form, they consist of the simple joist straps conventionally used in buildings with wooden members to interconnect girders and span members. In more complex versions, various interlocking, dovetailed connections have been devised. To be useful in a practical building system, such connectors must be easily attached, preferably at the factory to realize the economies of factory assembly, yet they should be so designed and fabricated that they will withstand the rigors of shipping and on-site handling. They should be capable of correct assembly at the building site by unskilled labor, permitting them to be employed in remote locations and especially in the underdeveloped countries. They should permit the span members to be attached to a girder at intermediate positions along its length, or at its end, the outside surface of the span member being in line with the end of the girder. Further, they should permit girders to be interconnected end to end. And most importantly, their design should contribute significant strength to the resulting interconnection without requiring massive elements and should ensure that the interconnected members are properly positioned relative to one another.

While achieving such a building system and interconnecting elements has challenged the building trade for decades, the fact that no design to date has succeeded is evident by the continued cut-and-fit method employed in construction, particularly of small wooden structures.

BRIEF DESCRIPTION OF THE INVENTION

A building system is disclosed which employs standard structural members, each interconnected to the adjacent members by simple preformed elements preferably formed from galvanized sheet steel. More specifically, the girders included in the building are interconnected with the joists or trusses that span the distance between the girders by simple, interlocking hangers, sometimes referred to as girder/span hangers. These hangers include two mating preformed sheet elements, one being affixed to the girder, the other to the span member. They incorporate wedge-shaped convolutions that interlock as one element seats down upon the other to interconnect the members in an aligned, rugged, rigid fashion. Each element is formed by two back-to-back halves, or sections, one being the mirror image of the other. They are shaped to provide not only interlocking convolutions but also interfitting vertical webs, the co-operation of the consolidations and the interfitting webs providing significant strength to bear lateral stresses. The half sections of at least one interlocking member incorporate reinforcing components, these components being fixed about the point at which the vertical load is transferred from one member to the other, the reinforcing components distributing this vertical load over a substantial area of the interlocked element. The elements are designed to interconnect the span member to a girder at an intermediate location along the girder, or in another form to attach a span member either with one surface in line with the end of the girder or to bridge and thereby interlock abutting girder members. These interlocking members therefore are adapted to interconnect abutting girder members and to attach to the girders a variety of span members including joists, trusses, and overhang extensions, all in a rugged, rigid, structurally sound fashion.

BRIEF DESCRIPTION OF THE DRAWINGS

The invention will be further described in connection with the accompanying drawings in which:

FIG. 4 is a perspective view of a span hanger element on the building members end of a truss;

FIG. 5 is a front view of the span hanger segments which together form the span hanger;

FIG. 6 is a perspective view of a girder hanger element shown on an intermediate portion of a girder member;

FIG. 7 is a cross-sectional view of an interlocked girder and span hanger;

DETAILED DESCRIPTION OF THE INVENTION

The building system of this invention includes a number of basic advantages, advantages that easily can be overlooked, particularly in view of the simplicity of the elements employed. In its most basic sense, the building system provides a building frame that is very simple to assemble from standard, manufactured structural components. The building frame may be adapted to provide an infinite variety of building designs only one of which, a simple box frame with a gable roof, will be detailed in the following material.

The building frame is fabricated from standard structural components including girders, joists, roof trusses, overhang elements, wall panels, stabilizers and sheathing. Certain wall panels will incorporate doors and windows of the style specified by the architect and at the specified location. To realize the full advantages of this invention, these components should be of standard dimensions, preferably in increments of one foot. Many advantages flow from such standardization, for only a limited number of manufactured components need be inventoried, production of working drawings of the building may to a large extent be automated, and pricing of the finished structure is appreciably simplified. Indeed, such pricing may be programmed for a computerized analysis of building designs and costs as well as for inventory control. These standardized components also reduce considerably the material required to assemble a building. For example, headers, trimmers, double-ply top plates and extra studs are not required.

The disclosed building system affords a greater structural stability than is available with most conventional approaches to building construction. Possibly the most basic advantage of the system is that the structural components incorporate fabricated interlocking connectors. This unique approach reduces decision making at the site to a minimum, saving all the time required for measuring, marketing, sawing and nailing that otherwise would be spent. Essentially all that is required to assemble the building system is a hammer, although a nailing gun also may be employed to advantage. Even large buildings may be assembled from these components with a degree of rapidity that is astonishing.

Figure 1:
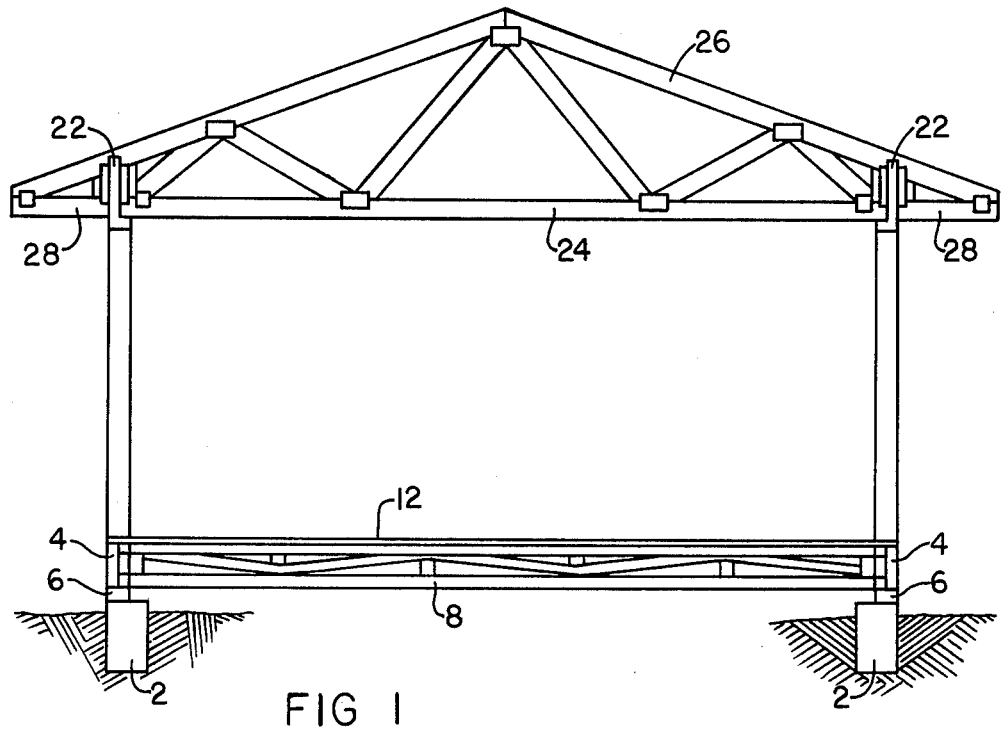
FIG. 1 is a vertical cross-sectional view of a building illustrating the major interconnecting members.
Figure 2:
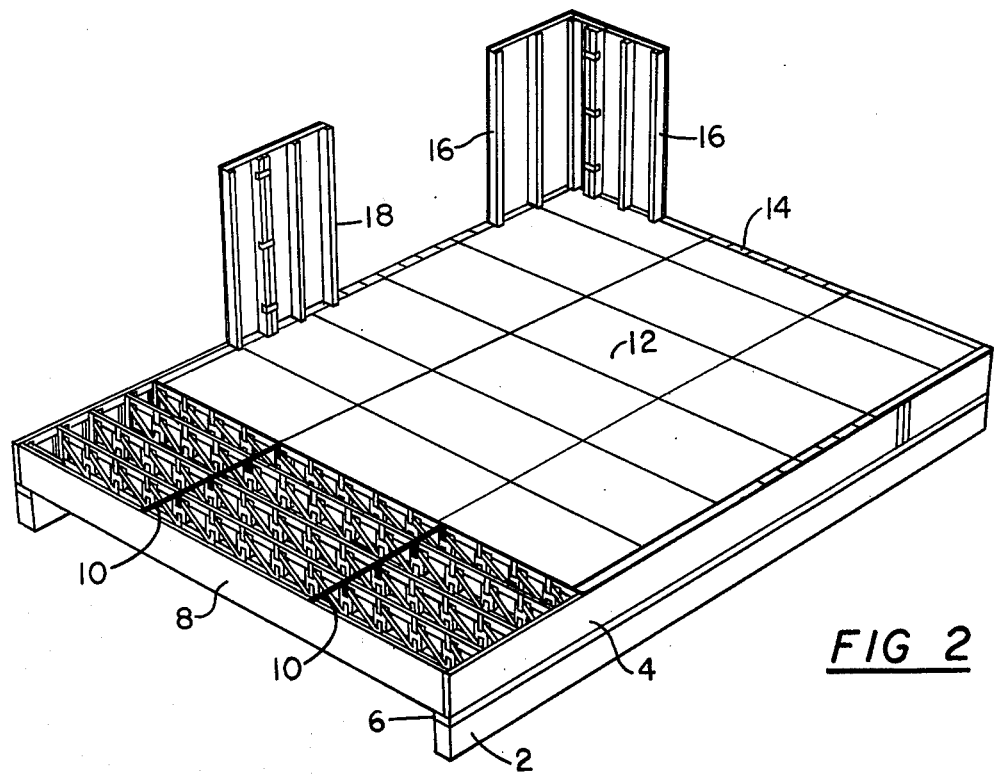
FIG. 2 is a perspective view of a partially completed building structure.

The basic building system may be constructed upon most any type of foundation such as a raised foundation, as shown in FIG. 1, consisting of footings 2. However, a slab foundation could be employed if desired, such a foundation permitting appreciable simplification of the disclosed floor construction as will be obvious to those skilled in the art. Upon each load bearing footing member 2 is fastened a girder 4 incorporating a sill 6. Floor joists 8 are interconnected with these girders and span the distance between the footings. The elements, which interconnect the girders and joists are basic to the building system, constitute an important part of this invention, and will be described in detail subsequently. After assembling these members, stabilizer rods 10 (FIG. 2) interconnect the joists, reinforcing the structure and underlying to seal the floor sheathing joints. Floor sheathing 12 is laid down and secured to the floor joists most conveniently by means of a nailing gun. FIG. 2 illustrates the floor and sub-floor structure of the building system with the sheathing partly installed.

Figure 3:
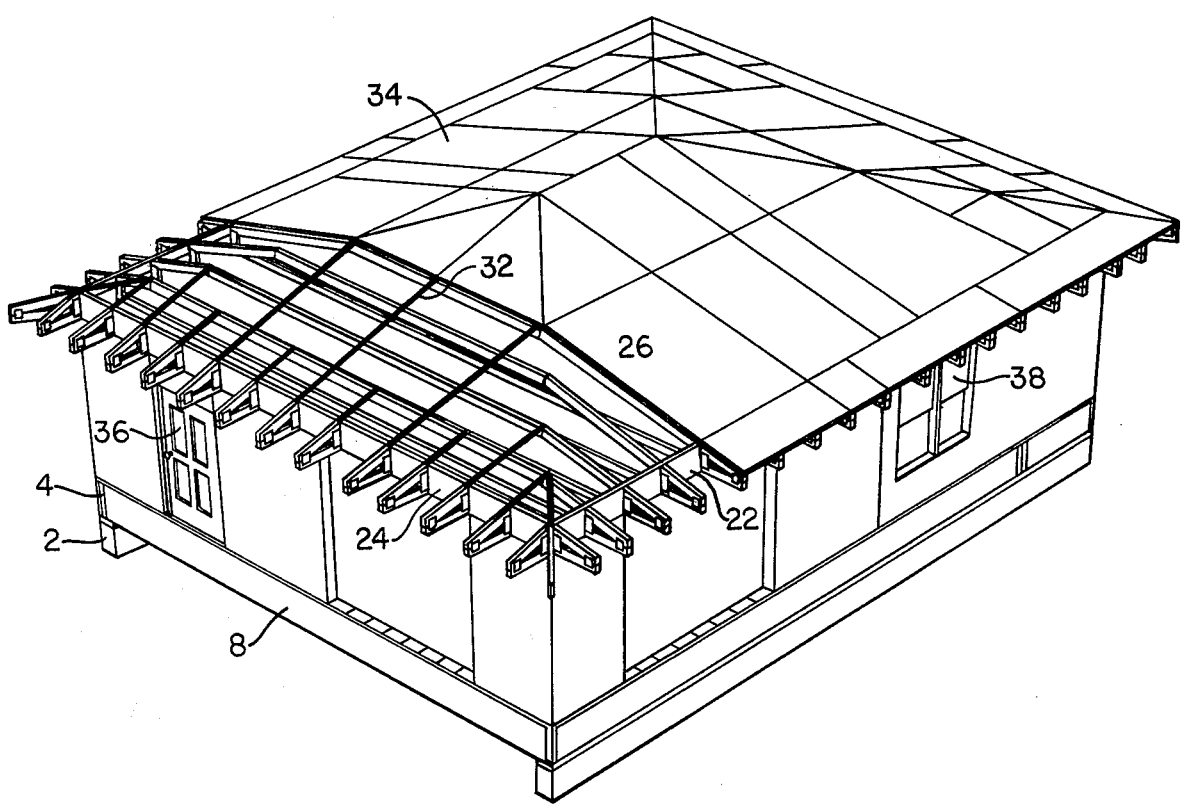
FIG. 3 is a perspective view of a building structure substantially completed and incorporating unique interconnecting elements.

After completely covering the sub-floor structure with floor sheathing, it is preferred next to trace the periphery of the building with a pressure sensitive tape 14 that bears, on a removable facing, markings in one-foot increments. This tape permits the wall panel sections to be quickly and accurately located while providing a weather seal gasket for the overlying wall panel sections. The facing of certain portions of the tape is removed in the areas that are to receive the wall panels, and wall panels are appropriately affixed to the floor structure. Three wall panels are illustrated in FIG. 2, two wall panel sections 16 forming the corner, and a wall panel section 18 being positioned at an intermediate location along one side of the building. After appropriately affixing such wall panels about the margin of the building, ceiling girders 22 (see FIG. 3) are attached by wall panel connectors to the top of the wall panels overlying the floor girders 4. Both ceiling joists 24 and truss sections 26 may be attached to the ceiling girder employing the girder/span hangers described subsequently. If desired, roof overhang members 28 also may be attached to the ceiling girder by such hangers. A series of roof stabilizers 32 (FIG. 3) are attached to interconnect and anchor the roof trusses while providing structural support for the sheathing joints. Then roof sheathing 34 is installed to completely cover the roof area and the overhang area, generally completing the enclosure as indicated in FIG. 3. Again, preferably a nailing gun is employed to attach the roof sheathing to the trusses, joists, and overhang members.

As the foregoing description makes quite evident, erection of the building system is an exceedingly simple process and can be accomplished in a minimum amount of time. By standardizing dimensions of the various elements, an infinite variety of building designs can be provided with a limited inventory of building elements. For example, only eight sizes of pre-cut floor sheathing are required to cover all possible floor plan variations, any particular variation requiring at most four different floor sheathing sizes. The roof sheathing is pre-cut in fourteen inventory sizes to cover all sizes and types of roofs (hip, gable and mansard) including roof valleys. The maximum number of different sizes any individual roof will require is six. Preferably the joining edge of each piece of sheathing on both roof and floor has a spacer spline coupling which interlocks with the coupling of adjacent sheathing sections to seal the assembly. Door and window wall sections 36 and 38 respectively may be incorporated, or added, as shown in FIG. 3, to complete the enclosure. Interior wall sections and utilities then are installed to finish the building. It should be noted that the truss member forming the girder and the joist is basically the same element, advantageously being formed as a continuous length with the hanger elements attached at two-foot intervals, then cut to the required inventory length. It should also be noted that because the roof truss is unrelated to the overhang, it may be fabricated into pre-cut sections, each an integral multiple of the basic two-foot spacing employed in the building.

A basic element of the building structure, indeed, an element that to a large extent makes possible the versatility of the structure's design and contributes significantly to its simplicity of erection is the girder/span hanger. To achieve the basic interconnections provided by this building system, only four hangers are required: an intermediate span hanger, an end span hanger, an intermediate girder hanger, and an end girder hanger. They are each described in the following sections.

THE INTERMEDIATE SPAN HANGER

The intermediate span hanger is shown assembled on a span member (a truss) in FIG. 4 and partially disassembled in FIG. 5. The intermediate girder hanger to which it attaches is shown assembled on a girder in FIG. 6. FIG. 7 is a cross-sectional view showing the girder and span hanger elements interlocked.

The intermediate span hanger consists of two segments, a right segment and a left segment shown separated in FIG. 5, which segments interlock on the span member to form a span hanger as shown in FIG. 4. When so assembled, the span hanger 40 provides a trapezoidal-shaped pocket 42 with convoluted sides and divided by a central vertical web, this pocket receiving a similarly shaped protrusion on the girder hanger, the convolusions of which preferably are sinusoidal shaped and interlock with the similarly shaped convoluted sides of the span hanger as best shown in FIG. 7.

The span hanger 40 consists of a right-hand segment 44 and a left-hand segment 46, both segments preferably being formed of a light-gauge (e.g. 20 gauge) galvanized sheet metal. The side wall 47 of each hanger segment bears integrally formed nail elements, as best shown in FIG. 4, which may be stamped from these side sections during formation of the segments. The nail elements are driven into the wooden structure of the joist or truss underlining the hanger to both connect the hanger to the span member and to interconnect the longitudinal elements of the span member to reinforce and render the end structure rigid.

As best shown in the cross-section of the span hanger presented in FIG. 7, the front wall 62 of the span hanger consists of a front face 64, a convoluted portion 66, a back face 68, and a vertical web 70, these portions being integral with one another and together forming the front wall of the span hanger. Also, these portions on the right-hand segment are the mirror image of the corresponding portions on the left-hand segment. As previously noted, when assembled as shown in FIG. 4, the convoluted side portions of the span hanger form inwardly sloping sides of a trapezoidal-shaped pocket 42 for receiving a similar shaped portion of the girder hanger shown, for example, in FIG. 6.

Incorporated in the segments of the span hanger are reinforcing components, segment 44 receiving component 72 and segment 46 receiving component 74. These components, which may be found, for example, of 12-gauge galvanized sheet metal, preferably are spot welded to the face of the segment, being received within the pocket between the front and side wall of the segments as shown best in FIG. 5. The reinforcing components serve to reinforce the span hanger at the point of greatest stress, namely, the point at which it bears with maximum force upon the girder hanger, and to distribute this force over the span hanger. Also as shown in FIG. 5, the segments include overlapping leaf portions 76 and 78, leaf portion 76 of the right-hand segment being in front of leaf portion 78 of the left-hand segment. Leaf portion 78 is appropriately shaped and recessed to permit leaf portion 76 to nestle with it in this overlapped relationship. Because of these corresponding overlapped portions of reinforcing components 72 and 74, the force exerted upon the span hanger in its bearing upon the girder hanger is distributed to both segments of the span hanger.

THE INTERMEDIATE GIRDER HANGER

The intermediate girder hanger illustrated in FIG. 6, also consists of two segments, a right-hand segment 82 and a left-hand segment 84. As best shown in the cross-sectional view presented in FIG. 7, each of these segments consists of a back wall 88, a convoluted portion 90, a front wall 92, and an inner wall 94, this inner wall including a vertical offset or recess portion 96. The right-hand segment is the mirror image of the left-hand segment. The vertical web portions 70 of the span hanger are captured between the inner walls 94 of the intermediate girder hanger, specifically between offset portions 96 as shown in FIG. 7. This materially assists in stabilizing and reinforcing the connection.

The back walls of the intermediate girder hanger also include nail elements 98 stamped from the wall material. These nail elements may be driven into the wood structure of the joist or truss underlying the hanger to both connect the hanger to the girder member and to interconnect the longitudinal elements of the member to reinforce and render the structure rigid. The back walls of the girder hanger also include indentations 102 (see FIG. 6) that assist in reinforcing and strengthening the girder hanger element. The inner walls 94 of the girder hanger terminate short of the top and bottom ends of the girder hanger, the ends of these wall portions bearing upon the top and bottom members of the girder to assist in defining their spacing, and to transfer some of the load carried by the girder hanger to the girder members by this bearing relationship. The girder hanger also preferably is made from sheet metal, such as 20-gauge galvanized steel.

Because of the shape and construction of the preferred intermediate span and girder hangers, the elements incorporate sufficient strength to resist the normal distorting forces encountered during handling and shipment of the members to which they are attached. While there nevertheless may be some slight distortion, also because of the shape of these elements they tend to correct any such distortion as the convolutions of the span hanger slip down about the convolutions of the girder hanger during attachment of the span members to the girder member. This corrects any slight misalignment that may have resulted from the portions of the elements being dented or knocked askew during handling and shipping, insures that they are snuggly nestled together and that the loading forces are uniformly distributed from one member to the other.

Figure 8:
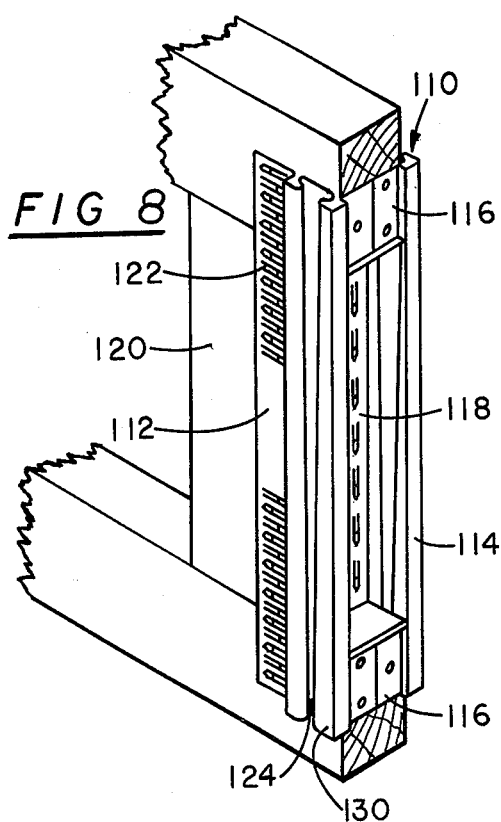
FIG. 8 is a perspective view of an end girder element on the end of a girder.
Figure 9:
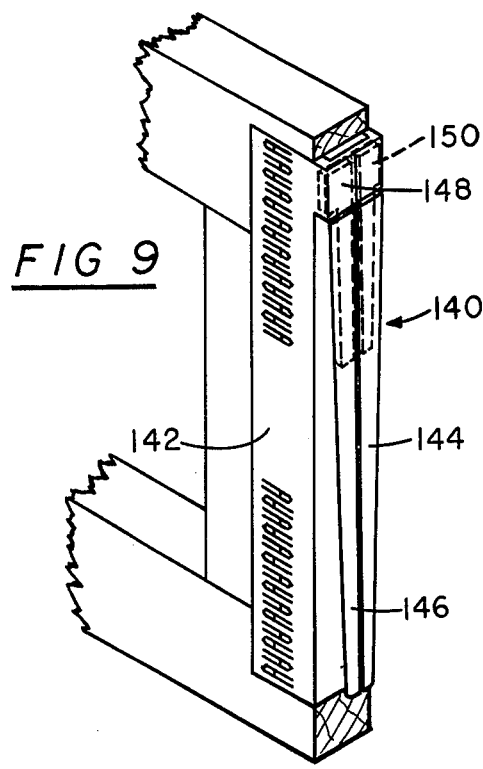
FIG. 9 is a perspective view of a male span hanger element on the end of a truss member.
Figure 10:
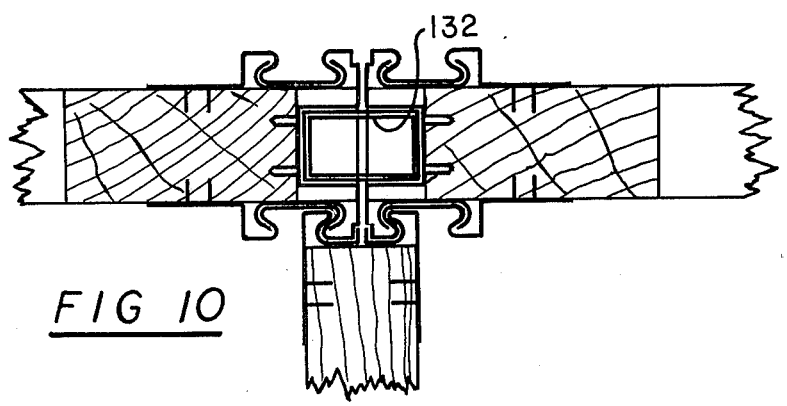
FIG. 10 is a cross-sectional perspective view of two abutted girder members and hangers bridged by an interconnecting span member and hanger.
Figure 11:
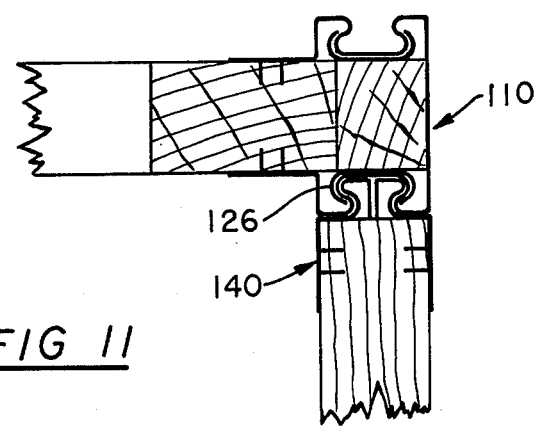
FIG. 11 is a cross-sectional view of an end girder hanger and member to which is attached a span hanger and member.

In addition to providing a rigid, strong attachment for span members to a girder member at intermediate positions along the girder, slight variations of the intermediate span and girder hanger elements may be used to attach a span member to the end portion of a girder member, to attach girder members together in an end-to-end relationship, or to attach a span member to abutting girder members, the span member abridging the abutting girder members to hold them together. FIG. 8 illustrates the end of a girder member with an end girder hanger attached thereto; FIG. 9 illustrates the end of a span member with an end span hanger attached thereto; FIG. 10 illustrates in cross-section the ends of two girder members positioned in an abutting relationship and interlocked by an intermediate span hanger such as illustrated in FIG. 4; and FIG. 11 illustrates an end girder with an end span hanger attaching the span member to the end of the girder member with the outer face of the span member in line with the end of the girder member.

THE END GIRDER HANGER

As with the other hangers of the system, preferably the end girder hanger 110 (FIG. 8) consists of two segments, a right segment 112 and a left segment 114, the segments generally being mirror images of one another. The segments include tabs 116 at their ends, which tabs are nailed or otherwise attached to the ends of the main beams of the girder member. The segments also include recessed surfaces 118 bearing nail elements, the recess surfaces of the segments matching the recess of the vertical end beam 120 of the girder member from the ends of the main longitudinal beams. The nail segments in recess 118 are driven into this end beam 120. The sides 122 of the segments also include integrally formed nail elements that may be driven into the end portions of the main beams and the end beam 120. By these attachments, the segments are attached to the end of the girder member.

Each side portion of the end girder hanger includes convolutions that form a wedge-shaped or trapezoidal pocket 124 for receiving a corresponding end span hanger. As shown in FIG. 10, this convolution is reinforce by a "C"-shaped backing section 126, which section also assists in transferring the vertical load applied by the end span hanger to the end girder. The side portion of the end girder also includes a corner section 130 that by virtue of the shape of the convoluted pocket 124 also generally is wedge-shaped. When two girder members are abutted against one another, as shown in FIG. 10, these corner sections 130 of the abutting girders together form a convoluted wedge shape protrusion of a size to receive an intermediate span hanger element 42 (which element is shown in perspective in FIG. 4). To assist in interlocking the abutting girder members and to transfer vertical loads from one girder to the other, a coupling member 132 is received in the recesses 118 formed by the end girder hangers at the end of the girder member. The coupling member may be simply a square tube preferably with a ⅛-inch thick plate welded to its top and bottom to close the tube.

THE END SPAN HANGER

The end girder hanger may receive in its convoluted pocket 124 an end span hanger, illustrated in FIG. 9, such that the outer surface of the span member is in line with the end of the girder member as shown in FIG. 11. The end span hanger includes a right segment 142 and a left segment 144, each segment having a side portion that incorporates nail elements which may be driven into the beam members as shown in FIG. 9. The front portion of each segment includes a protruding, wedge-shaped convolution 146, the convolutions of the two segments when abutting as shown in FIG. 9 being received in pocket 124 of the end girder hanger as shown in FIG. 11. The front portion of each segment also includes a rectangular top section 148. When the end span hanger is assembled, these sections overlap and rest upon the top surface of the end hanger to assist in transferring the load from the span member to the girder member. Received within the top, front portion of each span hanger segment is a reinforcing component 150, similar to those shown in FIG. 5, these components being welded to the respective segments of the span hanger element and shaped to overlap again in a manner similar to those shown in FIG. 5. These reinforcing components assist in transferring to the girder hanger and member the load carried by the span member while also reinforcing the end span hanger.

Preferably the girder member includes intermediate girder hangers spaced along both sides of the girder member as shown in FIG. 7, and end girder hangers attached at both ends of the girder member. Of course, should it only be desired to attach span members to one side of the girder member, then the girder hanger elements only need be attached to the girder along that one side. However, for uniformity in manufacture of the various members, it is preferred to include girder hangers spaced uniformly along both sides and at both ends of each girder member. Because of the design of the hangers, any which are not used will not present an obstruction to construction.

The span members and girder members may include diagonal reinforcing bars, the bars being attached to the members as derived by, for example, the nail elements of the various hangers. The members may also be reinforced by panels attached along on both sides. Of course, one or the other may be preferred for different numbers and designs. Either, both, or neither can be used as desired.

As shown for example in FIGS. 2 and 3, the hanger elements may be employed to attach a joist to the girder member, or a truss to the girder member, or an overhang member to the girder member. In each instance, the span hanger interlocks with the girder hanger, the girder hanger thereby defining the position of the span, truss, or overhang member as well as locking it to the girder and supporting it on the girder. Obviously, installation of the girder members on the wall sections, and of the joists, truss, and overhang members on the girder number, is quite simple and can be accomplished quickly and easily with little more than a hammer. Because of the slope of the roof, the top outer end portion of the span members attached to the overhang members 28 preferably are removed.

As described herein, the span and girder hangers provide a building system, the members of which may be fabricated in standard components at a factory, which will resist or compensate for the distorting forces normally encountered during handling and shipping, and which may be assembled at the construction site into virtually any desired building design. To illustrate the unique ability of these hangers and systems to carry the load normal to such building members, intermediate hangers fabricated as described herein of 20-gauge galvanized sheet steel and reinforced with 12-gauge sheet steel pieces were tested vertically loaded, and failed at approximately five times the design load for such members.

While the invention has been described in connection with a particular building design, and preferred embodiments of the hanger elements and components of the building system have been described, other designs of the building and of its elements will be apparent to those skilled in this art and may be employed, as taught herein, to realize the advantages of the disclosed system and structure. Accordingly, the scope of the invention is defined by the following claims.

What is claimed is:

1. A building structure system including interconnected girder and span members, the system incorporating interlocking means for interconnecting the girder and span members, said means comprising:
   a wedge-shaped girder element with convoluted sides,
   a wedge-shaped span element with convoluted sides, the convolutions of the girder element and the span element being shaped to nestle and interlock with one another,
   the span element including a top portion shaped to rest upon the top portion of the girder element and to transfer the load of the span member to the girder member,
   the girder element and the span element each being formed as two vertical half sections, the half sections being substantially the mirror images of one another, the half sections including a vertical web at substantially the mid-line of the wedge-shaped portions, the ends of the vertical web of the girder element bearing upon the main longitudinal girder members to assist in transferring the load borne by the girder element to the girder members and to assist in reinforcing the girder element, the vertical web of the span element being received between at least a portion of the vertical portions of the girder element, the span element incorporating reinforcing plates at the top portion,
   the girder element and span element being formed from sheet metal sections bent to the shape of the respective elements,
   means attaching the girder element to the girder member, and
   means attaching the span element to the span member, the span and girder elements being connected to their respective members such that when the members are attached to one another, the wedge-shaped interlocking portions point in a generally vertical direction, these convolutions both being sinusoidal-shaped in cross-section.

2. A building structure system as set forth in claim 1 in which the girder member includes a girder element at the end portion of the girder member, this girder element being shaped to provide a wedge-shaped member with convoluted sides at the side of the girder member, this member being positioned to receive said span element such that the side of the span member adjacent to the end of the girder member is in line with the end of the girder member.

3. A building structure system as set forth in claim 2 in which the end girder element also provides a wedge-shaped member with one convoluted side adjacent to the end corner of the girder member, whereby when two girder members are abutted in an end-to-end relationship, the adjacent corner elements provide a wedge-shaped protrusion with convoluted side to receive said wedge-shaped span element with convoluted sides, the span element spanning the joint between the girder member ends and assisting in interlocking the girders to one another.

4. A building structure system as set forth in claim 3 in which the end girder element includes a pocket at the end of the girder position to be in line with the corresponding pocket of an abutting girder, and a coupling member received in these aligned pockets, the coupling member assisting in interlocking the abutting girders and in transferring the vertical load of one girder to the adjacent girder.

5. A building structure system as set forth in claim 4, the building structure including girder members resting on foundations, span members connected to the girder members by said interlocking girder and span elements, the span members spanning the distance between the girders to provide a floor surface, wall members connected to that floor surface, girders connected to the tops of the wall members, truss members connected to the top girder members by interlocking girder and span elements, and overhang members connected to the top girder members by girder and span elements to extend the roof surface vertically beyond the wall surface.

* * * * *